July 9, 1946. B. BOLLI 2,403,844
REGULATION OF THE SCAVENGING AND CHARGING OF TWO STROKE
FUEL INJECTION INTERNAL-COMBUSTION ENGINES
Filed Sept. 13, 1944 2 Sheets-Sheet 1
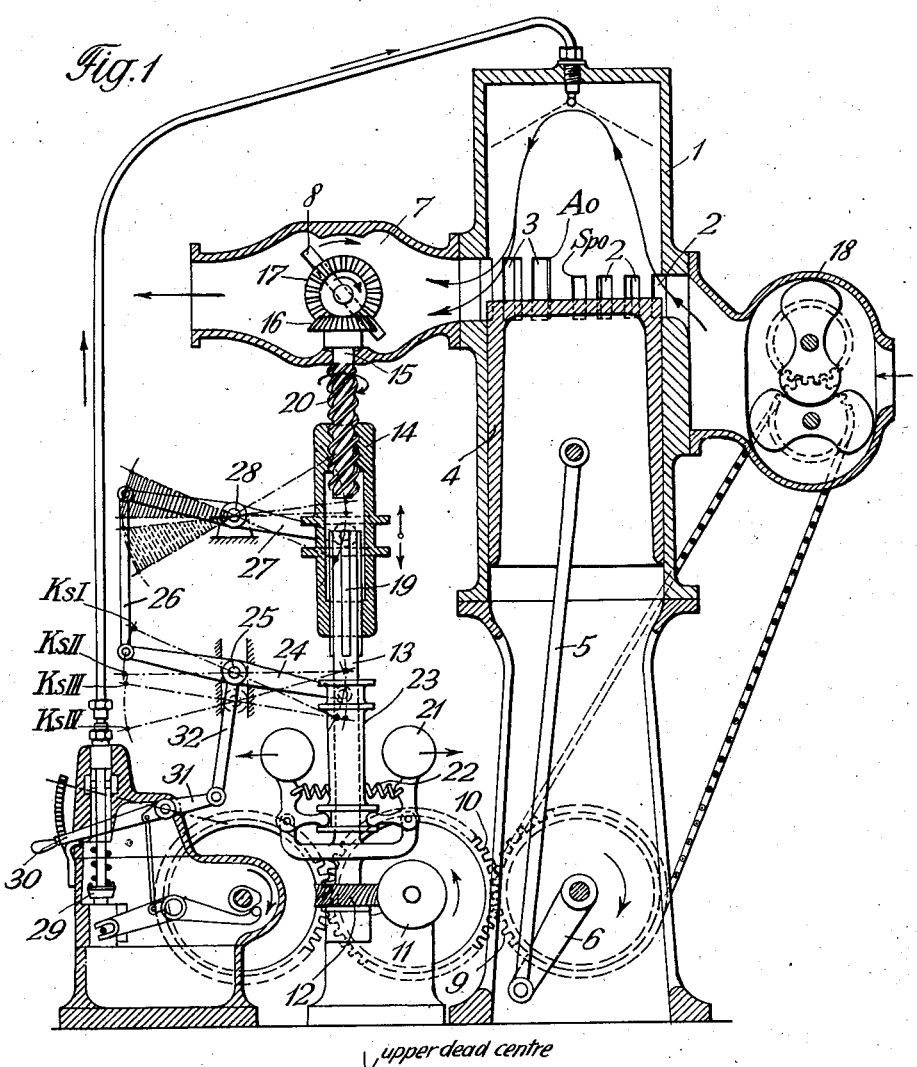
Fig. 1
Fig. 2
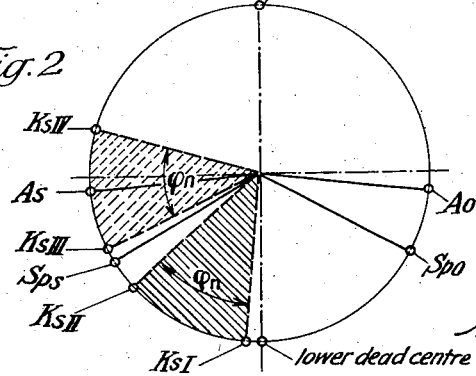
Inventor:
Bernhard Bolli
by
Michaelis & Michaelis
Attys

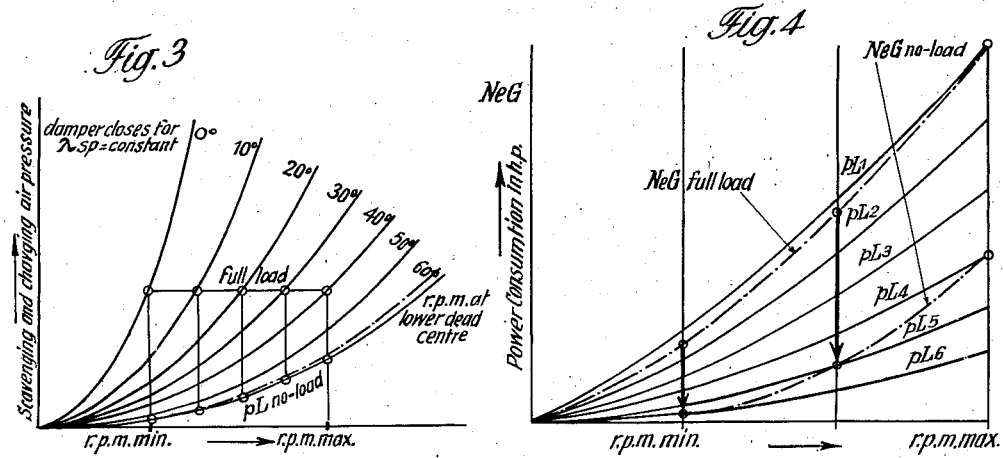
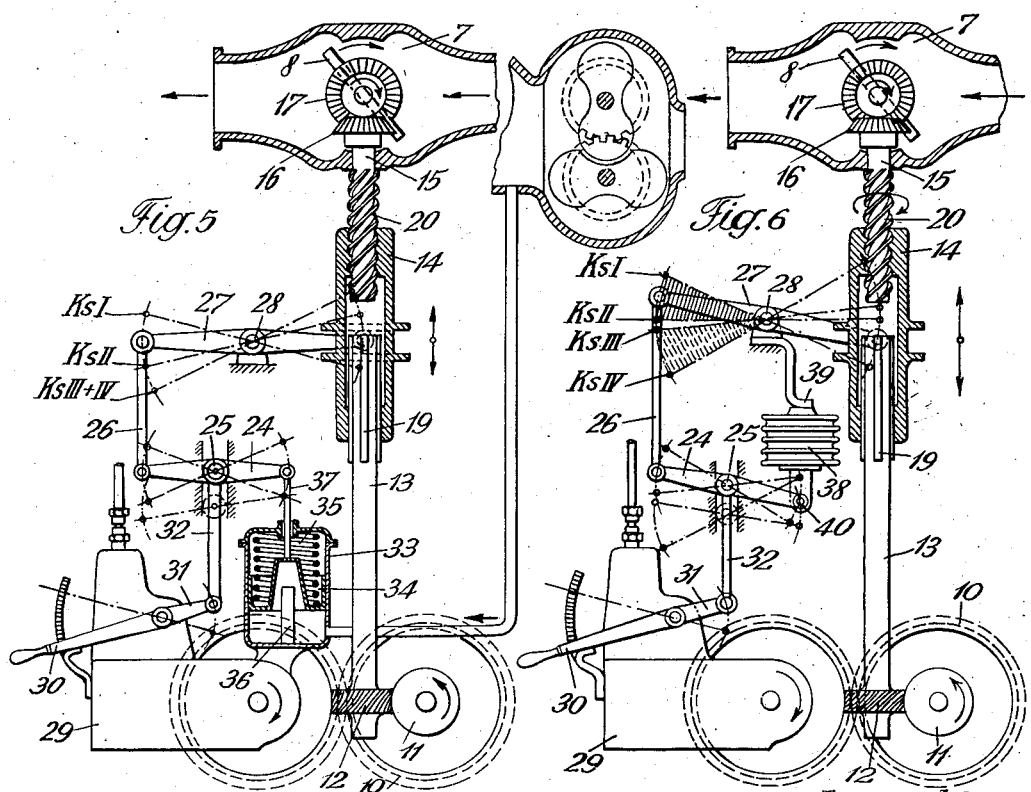

Patented July 9, 1946

2,403,844

UNITED STATES PATENT OFFICE 2,403,844

REGULATION OF THE SCAVENGING AND CHARGING OF TWO-STROKE FUEL INJECTION INTERNAL - COMBUSTION ENGINES

Bernhard Bolli, Arbon, Switzerland, assignor to Aktiengesellschaft Adolph Saurer, Arbon, Switzerland Application September 13, 1944, Serial No. 553,916
In Germany July 12, 1943

6 Claims. (Cl. 123—65)

This invention relates to internal combustion engines of the two cycle fuel injection type. It more particularly relates to the regulation of the scavenging and charging operation of such engines operating under highly variable conditions.

In engines of this kind which are provided with directly driven scavenging and charging blowers and in the exhaust passage, for the purpose of obtaining maximum charges and accordingly high performance with a throttling member, for example, a flap or rotary valve or an oscillatory control member which throttles the exhaust ports before the intake ports are closed. The closing of the outlet means is timed in dependence upon some factor of operation, in such manner, that under various full load conditions of operation maximum charging weights are obtained. The closing time of said throttling member is so controlled for each full load operating condition that in the working cylinder the greatest possible weight of fresh air is retained in cooperation with the scavenging and charging blower driven by the engine. In this arrangement the scavenging and charging blower is required to constantly operate against maximum counter pressure and, therefore, always consumes a maximum of power.

In other engines of this type the closing of the throttling member in the exhaust passage is automatically controlled in dependence upon the engine speed, in such manner, that the closing of the throttling member is advanced as the engine speed drops with a view to preventing the cycle time controlled port areas from increasing as the speed drops, in consequence whereof the charging air weights would decrease.

In other known engines the throttling member in the exhaust passage is automatically controlled in dependence upon the scavenging and charging pressure, in such manner, that as the scavenging and charging pressure rises the closing of the throttling member is retarded being advanced as this pressure drops.

In further known engines the time of closing of the throttling member in the exhaust passage is automatically controlled in dependence upon the atmospheric air pressure, that is, the altitude at which the engine operates, in such manner, that as the pressure of the atmospheric air drops at higher altitude the closing of the throttling member is advanced. This measure is applicable particularly to aircraft engines.

With these engines the control of the closing phase of the throttling member in the exhaust passage in dependence upon the factors of operation mentioned above has for its purpose to maintain the greatest possible weight of charging air in the working cylinder under any condition of operation. Therefore, with this kind of regulation a maximum torque can be obtained for instance at every speed or altitude. However the power demand of the blower driven by the engine is always equal to the maximum efficiency corresponding to the respective full load operating condition. In consequence thereof, in machines which frequently must operate under partial load only power consumption of the blower becomes excessively great within the range of partial load and at no load so that the average fuel consumption of the engine is substantially raised.

In another known kind of engines a by-pass is provided in the blower, to reduce the energy consumed in the delivery of the scavenging and charging air within the range of partial load, this by-pass connecting the pressure side with the suction side and being throttled more or less. With this arrangement it is possible to reduce the scavenging and charging pressure to some extent within the range of partial load and thus somewhat to reduce the power consumption, due to the lower delivery pressure. However this delivery pressure of the blower which is equal to the overpressure of the scavenging air, should be reduced only to such an extent that a thorough scavenging of the working cylinder is still warranted. But since the throttling member arranged in the exhaust passage is always automatically closed as early as possible the cycle time controlled port area of the engine is always automatically held a size as small as possible. Therefore, with by-pass regulation of the blower a relatively great scavenging pressure corresponding to this small cycle time controlled port area must yet be maintained otherwise appropriate scavenging of the working cylinder is questionable. The saving in power consumption of the blower is thus relatively small, and the blower is highly heated, its efficiency is impaired, and the volume of air passing through the blower is not thoroughly utilized for the scavenging and cooling of the working cylinder.

According to the present invention these operating conditions are fundamentally improved in that the time of closing of the throttling member in the exhaust passage is controlled in dependence upon two factors of operation jointly, the control impulse obtained in dependence upon one operating factor tending to raise the scavenging and charging pressure as much as possible while the control impulse obtained in dependence upon the other operating factor tends to reduce as much as possible the scavenging and charging air pressure within the range of partial load and no-load running.

While the operating factor that maintains the scavenging and charging pressure at the highest possible value by varying the time of closing of the throttling member may be the engine speed, the scavenging and charging pressure itself or the pressure of the atmospheric air, the second operating factor tending to keep the scavenging and charging pressure as low as possible is a value which determines the degree of loading of the engine based, most advantageously, on the quantity of fuel to be injected into the engine.

By virtue of this measure according to the present invention, the cycle time controlled port area of the engine is increased when changing over to smaller load. In consequence of this the volume of air required for scavenging can be conveyed through the engine at a lower pressure. The scavenging blower then operates at a substantially smaller ratio of air pressure so that the energy consumption of the blower becomes accordingly smaller. Owing to this measure the fuel consumption of the engine decreases to a considerable extent within the range of partial load and no-load running. Fuel consumption is substantially smaller than in machines in which cycle time controlled port area cannot be varied or in the engines in which the throttling member in the exhaust passage is adjustable only in dependence upon a single factor of operation tending to raise the scavenging and charging pressure to a value as great as possible regardless of the degree of loading of the engine.

Several embodiments of a device according to this invention are illustrated diagrammatically in the accompanying drawings in which Fig. 1 is a schematic cross section of a two-cycle solid injection internal combustion engine regulated by controlling the time of closing of the throttling member in the exhaust passage in dependence on the engine speed quantity of fuel to be injected into the engine;

Fig. 2 shows the corresponding control diagram and

Fig. 3 is a diagram showing the required scavenging pressure in dependence upon the engine speed with the time of closing of the throttling member varying;

Fig. 4 is a diagram illustrating the energy consumption of the air blower forming part of the engine shown in Fig. 1 in dependence upon the scavenging pressure and the engine speed;

Fig. 5 is a schematic cross sectional view of another embodiment in which the time of closing of the throttling member is controlled in dependence upon the quantity of fuel injected and the scavenging and charging pressure;

Fig. 6 is a similar view of a third embodiment in which the time of closing of the throttling member is controlled in dependence upon the quantity of the fuel injected and the pressure of the atmospheric air, that is, upon the altitude at which the engine operates.

In the embodiment shown in Fig. 1 I is the working cylinder which is provided with intake ports 2 for the scavenging air and exhaust ports 3 for the exhaust gases. In the working cylinder I the working piston 4 is reciprocable being connected with a crankshaft 6 by a connecting rod 5 the intake ports 2 and the exhaust ports 3 being controlled by the piston 4. In order to provide for retaining a greater volume of charging air in the cylinder a throttling member 8 actuated by the engine is arranged in an exhaust passage 7 communicating with the exhaust ports 3.

This throttling member here has the form of a butterfly-valve, but it may also be a rotary slide valve or some other throttling member. It is driven by the crankshaft 6 of the engine through a pair of spur gears 9, 10, a pair of screw gears 11, 12, a spindle 13, an adjusting sleeve 14, a stub spindle 15 and a pair of bevel wheels 16, 17. The ratio of gearing of this driving arrangement may be 1:0.5; 1:1 or 1:2 with regard to the speed of revolution of the engine, dependent upon the engine construction concerned. The time of closing of the throttling member is so chosen that the exhaust passage is shut off before the piston 4 in its outward stroke again sweeps the intake ports 2. The air having entered the cylinder through the intake ports under the scavenging and charging air pressure $pL$ can thus be retained in the cylinder. It is supplied by a blower 18 driven by the engine.

If the engine is intended to operate within a wide range of speed at highest efficiency, provision must be made that throughout this range, under full load at least, the pressure $pL$ produced by the blower and thus the air weight available in the cylinder for the combustion can be maintained at a substantially constant value throughout the entire range of speed. This is however, as is well known, possible only when the entire cycle time controlled intake and exhaust port area of the engine is varied so that as the engine speed drops this area is reduced.

This is effected in the kind of engine to which the invention relates by advancing the closing of the throttling member 8 in the exhaust passage as the engine runs at low speed. For this purpose the spindle 13 is provided with straight splines and the stub spindle 15 with steeply ascending threads. The two spindles are interconnected by the adjusting sleeve 14. If the adjusting sleeve 14 is upwardly displaced the closing of the throttling member 8 is retarded, whereas in moving the sleeve downwardly the closing of the throttling member 8 is advanced.

On the spindle 13 is mounted; a centrifugal governor 21 comprising a spring 22 and a control sleeve 23 which in operation is adjusted in dependence upon the engine speed so that as the speed is increased the sleeve rises and is lowered as the speed decreases. The sleeve 23 is engaged by an adjusting lever 24 pivoted at 25 which transmits the movement of the sleeve 23 through a connecting rod 26 to a rocking lever 27 which pivots about a fixed point 28, while its other end engages the sleeve 14 to adjust them in accordance with the movement of the governor sleeve 23.

By this means the time of closing of the throttling member in the exhaust passage is adjusted in dependence upon the engine speed so that as the engine speed rises the closing of the exhaust passage by the throttling member is retarded and is advanced as the engine speed drops. Consequently the cycle time controlled port area of the engine is varied in dependence upon the engine speed, in such manner, that said area is reduced as the speed drops and is increased as the engine speed rises.

Fig. 2 shows how the piston opens the exhaust ports at point Ao and the scavenging ports at point Spo; at point Sps the scavenging ports and at point As the exhaust port slots are closed by the piston. In the absence of a throttling member in the exhaust passage compression would begin only at the latter point, and the air weight enclosed in the cylinder when the piston is in this position would determine the maximum efficiency that actually could be obtained. However, by arranging a throttling member in the exhaust passage the closing of the exhaust port openings is advanced as indicated for full load by the hatched angular range $\varphi_n$ between points KsI and KsII. At lowest speeds the closing occurs at KsI incidental to which the cycle time controlled port area is relatively small. At the highest speed the closing occurs at KsII at which time said port area is materially greater.

In Fig. 3 the scavenging air pressure resulting in a constant volume $\lambda_{sp}$ of scavenging surplus air is plotted against the engine speed. For various closing points of the throttling member within a range between 0° to 60° away from the lower dead centre the requisite scavenging pressures are plotted in the direction of the axis of ordinates. This figure also shows that in varying this closing point of for example 40° away from the lower dead centre to 0°, the said scavenging pressure remains substantially constant between the greatest and the smallest engine speed as indicated in this figure, so that the charging air weight enclosed in the cylinder can be maintained at a value great enough to produce a constant or even an increasing torque as the engine speed drops. The variation of the closing time of the throttling member arranged in the exhaust passage in dependence upon the engine speed within the range KsII in Fig. 2, therefore, has the effect of maintaining a scavenging and charging pressure as great as practically possible throughout the entire range of engine speeds and thus also of obtaining a driving torque as great as practically possible at each engine speed.

The mode of regulation described above results in substantial advantages within the range of maximum load. As shown in Fig. 4, in which the power consumption of the engine driven blower is plotted against the engine speed for different values of the scavenging and charging pressure, the blower always presents the maximum demand on driving power, that is, that which is indicated in a dotted curve in Fig. 4 at "NeG—full load" in accordance with the course of the curve "pL—full load" as indicated in Fig. 3. In the part-load operating region as well as in the no-load condition this relatively great driving power for the blower is highly unsatisfactory from the point of view of fuel consumption.

According to the present invention the power consumption is improved in the operation under part-load and at no-load in that the driving power for the blower is reduced by decreasing the delivery pressure as indicated by the arrows in Fig. 4. In order to provide for a reduction of the scavenging pressure it is, however, necessary to vary the closing time control by the throttling member in the exhaust passage, in such manner, that the cycle time controlled port area is increased as the load on the engine decreases. At no-load running of the engine the said port area is, advantageously, controlled to the maximum extent. This is effected in such manner that for no-load running the throttling member is closed only while the air intake of the engine is being closed or only after it has been closed. An ample supply of scavenging air to the working cylinder as required for an appropriate scavenging of the same can then be obtained by means of a substantially smaller scavenging overpressure $pL$. In Fig. 3 the scavenging overpressure required in applying this measure is represented by the chain-dotted curve "pL—no load."

According to the present invention this method of regulation is carried into effect in an engine as shown in Fig. 1 by varying the time of closing by the throttling member not only in dependence upon the speed of revolution but in addition also in dependence upon the load on the engine, that is, dependent on the quantity of fuel injected into the engine. In the arrangement shown in Fig. 1 the fuel quantity is varied by actuating a control lever 30 provided on the injection pump. The lever 30 has an arm 31 extending to the rear to which a rod 32 is pivoted. This rod is connected in turn with a fulcrum 25 on an adjusting lever 24. In varying the fuel quantity by actuating the lever 30 the fulcrum 25 is shifted at the same time in such manner that this fulcrum is lowered as the fuel quantity is decreased.

Provided that the engine speed remains constant the control sleeve 23 constitutes the fulcrum for the adjusting lever 24. Therefore, as the fuel quantity is decreased the adjusting sleeve 14 is raised by the lever 24 through a rod 26 and the rocking lever 27 which rocks about a fixed point 28 in consequence whereof the closing of the exhaust passage by the throttling member in the exhaust passage is retarded. During no-load running, i. e. at the lower speed the closing takes place at point KsIII. At highest speed the closing occurs at point KsIV, which results in a range of closing control $\varphi_n$. Therefore, in running at no-load, as indicated in the control diagram shown in Fig. 2, with the engine performing a minimum of revolutions the throttling member closes at about the same moment at which the piston closes the intake ports, while, with the engine running at highest speed of revolution the closing occurs considerably later so that the working cylinder is closed only after the piston has moved past the exhaust ports.

The principle on which the present invention is based, can be applied also to engines in which the variation of the time of closing the exhaust passaage, instead of being dependent on the speed of revolution, is effected dependent on the scavenging and charging pressure, in such manner, that as the scavenging and charging pressure decreases the cycle time controlled port area is reduced, due to advancing of the closing of the exhaust passage, but is enlarged as the scavenging and charging pressure rises, due to retardation of the closing, and wherein, therefore, the variation of the time of closing of the throttling member in dependence upon the said first operating factor also tends to raise the scavenging and charging pressure as much as practically possible.

The method of regulation of such an engine is schematically illustrated in Fig. 5. The governor of the engine used in the arrangement of Fig. 1 is here replaced by a pressure cylinder 33 in which a piston 34 is slidably guided. The lower end face of this piston is acted upon by the scavenging and charging pressure $pL$, whereas the opposite piston end face is loaded by a spring 35. Therefore to each scavenging pressure $pL$ corresponds a certain position of the piston 34. Under a scavenging pressure as required for running at minimum speed of operation and under full load the piston 34 abuts against a stop 36. The piston 34 is connected by means of a rod 37 with the adjusting lever 24 which pivots on an adjustable fulcrum 25 as in the first embodiment. With the scavenging pressure pL dropping the piston 34 descends. The adjusting sleeve 14 is lowered by means of the lever 24, the rod 26 and the rocking lever 27, in consequence whereof, the closing of the throttling member is advanced and the cycle time controlled port area is reduced so that the scavenging and charging pressure is raised to a higher value again. The scavenging and charging pressure is thus maintained at a value as high as practically possible in accordance with the characteristic of the spring 35.

According to the present invention the fulcrum of the rocking lever 24 is connected by means of the rod 32 with the admission lever 30 of the fuel pump. In changing over to part-load operation the fulcrum 25 descends, whereby the closing movement of the throttling member is retarded. The scavenging pressure will drop while the piston 34 moves downwards, thereby first to oppose the control movement. However, as the piston 34 then bears against the stop 36, in further decreasing the fuel injection quantity, the adjusting sleeve 14 will be readjusted so that the closing of the throttling member is further retarded.

During running at no-load the throttling member shuts off the exhaust passage at each revolution as late as at the points KsIII and KsIV, which in this case coincide, that is, only after piston 4 has covered the intake ports 2. Therefore, with the engine running under part-load or at no-load the scavenging and charging pressure is also reduced to a minimum still sufficient for an appropriate scavenging, whereby the driving power required for the blower is materially reduced.

In engines operating with solid injection which are required to operate at widely varying altitudes, the controlling of the closing time by the throttling member in the exhaust passage can also be effected in dependence upon the altitude i. e. the atmospheric air pressure. In so varying the cycle time controlled port area of the engine the dropping of the scavenging and charging pressure at rising altitude is counteracted, whereby here also the regulation has the effect to raise the scavenging and charging air pressure to a practically possible maximum.

In order to reduce the power consumption of the blower when running under part-load or at no-load and to reduce the fuel consumption the regulation of the closing time can in principle again be effected in dependence upon a second factor of operation which consists in the fuel injection quantity, so as to reduce, when running under part-load or at no-load, the scavenging and charging pressure to a minimum while warranting a satisfactory scavenging.

In Fig. 6 the regulating device for an engine of this kind is schematically illustrated. The governor for regulating the speed of revolution as shown in Fig. 1 and the pressure cylinder shown in Fig. 5 respectively are here replaced by a flexible barometric cell 36. The end 39 of this capsule is attached to a fixed point whilst the free end 40 of the cell is arranged on the adjusting lever 24 as described in connection with the preceding examples. To every altitude H corresponds a predetermined length of cell and thus a certain position of the pivot joint 40. As the altitude of operation increases the cell elongates and the pivot joint 40 moves downward so that by means of the adjusting lever 24, the rod 26 and the rocking lever 27 the adjusting sleeve 14 is displaced downwardly which results in advancing the time of closing of the throttling member. The spindle 13 is formed with splines 19, the stub spindle 15 with steeply ascending threads. The two spindles are connected by the adjusting sleeve 14, the top end of which is threaded inwardly. If the sleeve 14 is lifted, it will retard the closing movement of the throttling member 8, whereas, if the sleeve is moved downwardly, the closing movement is advanced. Hereby the cycle time controlled port area of the engine is reduced and the supply of scavenging air which, if this area were left unchanged, would increase as the altitude of operation increases, is maintained constant so that the blower is rendered capable of maintaining a substantially unchanged charging weight in the working cylinder even if the altitude of operation increases.

At lowest altitude of operation Ho (an aircraft resting on the ground) the closing point is represented by KsII. At greatest altitude Hmax the closing point is represented by KsI. In changing over from part-load to no-load running also in this engine the scavenging and charging pressure can be lowered to a minimum allowable value still sufficient for appropriate scavenging, by enlarging in accordance with the invention the cycle time controlled port area, for the purpose of economizing in blower output and driving power. In this kind of regulating device also the arm extension 31 of the admission control lever 30 is connected with the fulcrum 25 of the rocking lever 24 by means of a rod 32.

In order to decrease the fuel quantity to be injected the fulcrum 25 can be lowered. At a certain altitude H the fulcrum is constituted by the pivot joint 40. Through the rod 26 and the rocking lever 27 the adjusting sleeve is displaced upwardly so that the point of closing of the throttling member is advanced. By this means the cycle time controlled port area of the regulating device is enlarged and the scavenging and charging pressure is reduced. The driving power consumption required by the blower is thus substantially decreased in running under part-load and at no-load and the demand on fuel consumption is improved. At minimum altitude Ho and no-load running of the engine and in running the engine at maximum altitude Hmax the throttling member closes at points KsIV and KsIII respectively.

I wish it to be understood that I do not desire to be limited to the exact details shown and described, for obvious modifications will occur to a person skilled in the art.

I claim:

1. Two-stroke cycle internal combustion engine comprising in combination, a working cylinder, a piston reciprocable in said cylinder, a fuel injection device, an air blower directly driven by the engine in synchronism therewith and communicating with the intake ports, an exhaust conduit communicating with the exhaust ports, an engine-driven throttle in said exhaust conduit and mechanism for controlling the closing movement of said throttle in dependence upon the quantity of fuel injected and the engine speed jointly in such manner that the closing movement of said throttle is retarded, as the quantity of injected fuel drops, and is advanced as the engine speed drops.

2. The engine of claim 1, in which the throttle control mechanism is arranged to operate in dependence upon the quantity of fuel injected and the scavenging and charging air pressure, the closing movement of the throttle being retarded as the quantity of injected fuel drops, and being advanced, as the scavenging and charging air pressure drops.

3. The engine of claim 1, in which the throttle control mechanism is arranged to operate in dependence upon the quantity of fuel injected and the atmospheric air pressure, the closing movement of the throttle being retarded as the quantity of injected fuel drops, and being advanced, as the atmospheric air pressure drops.

4. The method of operating two-stroke cycle internal combustion engines provided with means for forcing in air for charging and scavenging in synchronism with the engine revolutions, which comprises timing the discharge of exhaust gases in synchronism with the operating cycle, supplying fuel for combustion and throttling the discharge of exhaust gases in dependence upon the quantity of fuel injected and the engine speed in such manner that throttling is retarded as the quantity of injected fuel drops, and is advanced as the engine speed drops.

5. The method of claim 4, in which the discharge of exhaust gases is throttled in dependence upon the quantity of fuel injected and the scavenging and charging air pressure jointly, the throttling being retarded as the quantity of injected fuel drops, and being advanced as the air pressure drops.

6. The method of claim 4, in which the discharge of exhaust gases is throttled in dependence upon the quantity of fuel injected and the atmospheric air pressure jointly, the throttling being retarded as the quantity of injected fuel drops, and being advanced as the air pressure drops.

BERNHARD BOLLI.